Patented Jan. 12, 1943

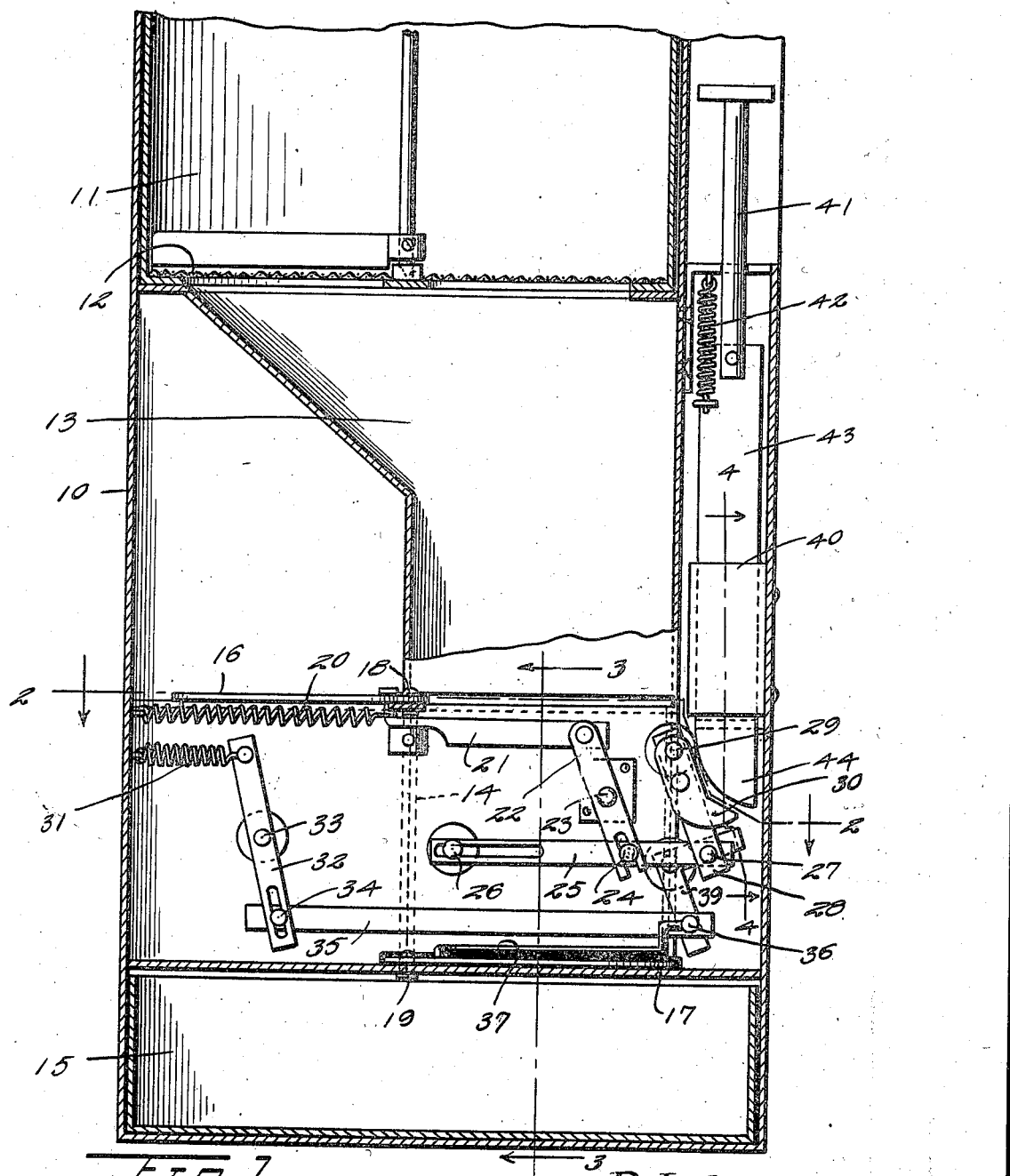

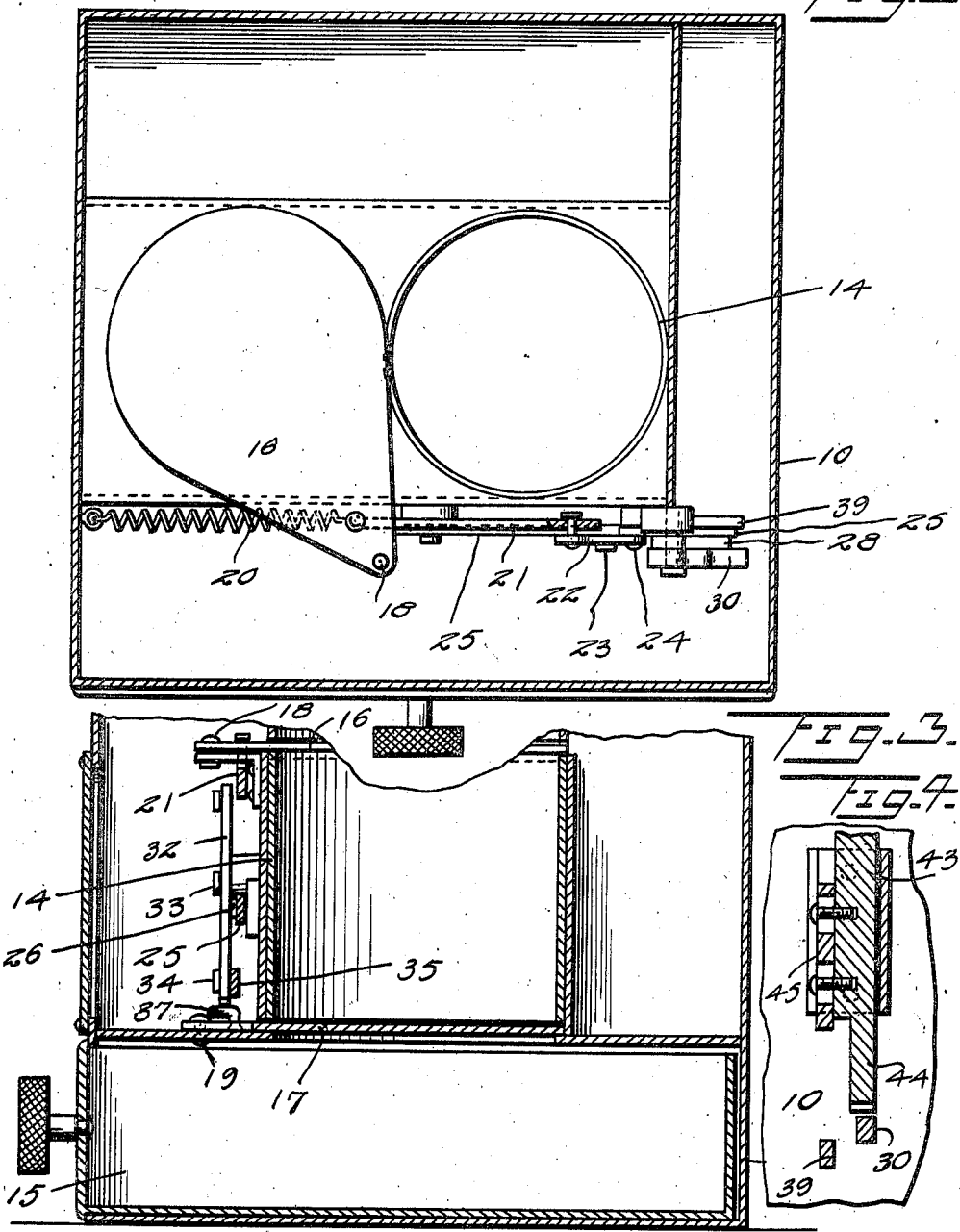

2,308,359

UNITED STATES PATENT OFFICE 2,308,359

MEASURING DEVICE

Bartholomew L. Cyr, St. Johnsbury, Vt.

Application October 14, 1940, Serial No. 361,176

3 Claims. (Cl. 221—112)

This invention relates to measuring devices, and more particularly to those in which a predetermined measure of some powdered or granular substance is delivered by a single operation.

In devices of this type, in which the material is released into a measuring compartment and from thence into position to be available by the user, some means must be devised for closing the top of the compartment and at the same time opening the bottom thereof to dispense the material. Various devices have been developed to accomplish this, but, so far as I am aware, no one has as yet accomplished this operation by mechanism having the specific advantageous combination and arrangement of that embodied in my invention.

The object of this invention is an efficient and smooth-working measuring device.

A further object is a measuring device which will dispense, with one stroke of the operating plunger, a predetermined amount of powdered or granular substance.

A still further object is a device for accomplishing the above result which will be economical to manufacture and efficient in operation.

These and other objects may be accomplished by employing my invention which embodies among its features a hopper, a measuring cup whose top is open into the hopper and whose bottom is open for dispensing, a shutter for the top of the cup, a shutter for the bottom of the cup, and means for simultaneously opening the bottom shutter and closing the top one to dispense material, said means consisting of cam and lever structure operated by a single manual plunger.

Other objects and features may become evident from the following disclosure when taken in connection with the accompanying drawings in which:

Figure 1 is a vertical cross-section view of my device.

Figure 2 is a cross-section view taken on line 2—2 of Figure 1.

Figure 3 is a cross-section view taken on line 3—3 of Figure 1.

Figure 4 is a cross-section taken on line 4—4 of Figure 1.

Referring to the drawings in detail, the outside casing 10 contains a bin 11 for storing the material and a sifting screen 12 through which the material may flow into a hopper 13. Coincident with the bottom of the hopper is a measuring cup 14 as may be seen more clearly in Figures 2 and 3. The bottom of this cup is open, and leads into a dispensing drawer 15.

In order to be operative, the measuring cup must be closable and openable on its top and bottom at will. For this purpose shutters 16 and 17 are provided, being pivoted as at 18 and 19, respectively, adjacent the top and bottom of the measuring cup in conventional manner. It is obvious that, when the shutter 17 is open, shutter 16 must be closed to prevent loss of material from the bin during the dispensing operation, and when the shutter 16 is open to fill the cup, the shutter 17 must be closed. The dispensing operation, therefore, consists in closing the previously opened shutter 16 and opening the previously closed shutter 17.

To accomplish this I provide a spring 20 to hold the shutter 16 normally open, and a means to close this shutter consisting of a link 21 loosely attached to the shutter and operated by lever 22 pivoted at 23. The lower end of this lever is slotted and engages a pin 24 on link 25 which is slidably attached by a slot to stationary pin 26. The forward end of this link is pivoted at 27 to a cam-operated lever 28, journalled at 29, and having the follower member 30. Thus, when this follower is depressed, as will be explained, it operates through link 25, lever 22, and link 21 to close shutter 16 against the spring.

Likewise, the shutter 17 is normally held closed by spring 31 which operates through a lever 32 pivoted at 33 and slotted on its end to receive pin 34 on link 35 which has pin 36 on its end. Link 37 connects the pin 36 to the shutter 17 so that the forward thrust on the link 35 holds the shutter closed. There is a rocker lever 39 pivoted at 38 with its lower arm attached to pin 36 and its upper arm in position to be operated by a cam. Thus when this arm is depressed it causes a rearward motion of pin 36 to open shutter 17.

The operating cam 43 is slidably held by guide means 40 on the front of the casing and has a manually depressible plunger 41 and is held in upward position by spring 42. The lower, or operative end of the cam 43, consists of a cam surface 44 (see Figure 4) which is positioned to engage lever 30. On the side of cam 43 is adjustably bolted an additional cam surface member 45 positioned so that, upon further depression, it will contact and operate lever 39 to open shutter 17. Accordingly, when the plunger 41 is depressed it will first close the shutter 16 and then open shutter 17 to cause the material to fall into the dispensing drawer 15.

As will be readily apparent the device is capable of structural modification for dispensing predetermined quantities of liquids or moist substances by employing a sliding valve at the feed outlet of the container or bin and a second sliding valve at the discharge from the measuring cup, in substitution for the sliding covers. Also, the device may be built for operation from different angular positions and may be operated by motive power, such as electricity, as well as manually. Other convenient modifications could embody the use of rollers to reduce friction and wear on contacting surfaces and the construction of the device with flat, square or other shaped material and to use the device for any purpose requiring measuring operations or where two or more actions or movements are desired at different positions or times by a single stroke of an actuating plunger. Furthermore, the storing compartment or bin can be built in different shapes and removably mounted on the casing and may be constructed with any desired number of screens to sift the material therein in connection with agitating paddles or scrapers adapted to force different substances through the screens, such devices to be attached to a shaft operable by crank mechanism either manually or by power means.

Accordingly, it will be seen that my device provides a simple, easily operated and efficiently working means whereby, by merely depressing plunger 41, a predetermined amount of powder will be measured out. Although a preferred form is disclosed herein, I do not wish to be limited thereto but only by the scope of the appended claims.

What is claimed is:

1. In a measuring device, a measuring chamber having a feed opening and a discharge opening, a pair of pivotally supported shutter plates mounted for turning movement to closed and open positions with reference to the said openings, means for yieldingly holding the feed control shutter open and the discharge control shutter closed, a slidable operating member yieldingly held in retracted inoperative position, and link and lever mechanism having operative connection with the shutters and operative upon movement of the said operating member to extended position to swing the shutters so as to successively close the feed control shutter and open the discharge control shutter.

2. In a measuring device, a cylindrical measuring chamber having a feed opening at the top and a discharge opening at the bottom thereof, a pair of horizontally swingable shutter plates operable to closed and open positions with reference to the said feed and discharge openings, a horizontally movable link pivotally connected with the upper shutter, an actuating member slidably supported below the said link, a rocker bar having pivoted connection with the said link and slide member, a pivotally supported arm connected with the said slide member having a cam engaging projection, an elongated actuating member mounted below the slide member for longitudinal reciprocating movement, an angular lever pivotally supported above the elongated member and having pivoted connection therewith, the said angular lever having a cam engaging extension, a link connecting the lower shutter with the reciprocatory actuating member, a pair of springs connected with the said mechanism for yieldingly holding the top shutter open and the bottom shutter closed, and a slidably supported cam member yieldingly held in retracted inoperative position and operative upon extended movement to successively engage the said cam projections to sequentially close the top shutter and open the lower shutter.

3. In a measuring device of the character described, a vertical cylindrically shaped measuring chamber having a feed opening at the top and a discharge opening at the bottom thereof, a pair of horizontally swingable shutter plates movable to close and open the respective feed and discharge openings, spring means operative to yieldingly hold the upper feed shutter in open position and the lower shutter in closed position, a manually depressible cam member slidably mounted adjacent the said chamber, a spring attached to and disposed to yieldingly hold the cam member in retracted inoperative position, an operating link pivotally connected to each shutter plate, and mechanism mounted at one side of the chamber having pivoted connection with the respective links operative upon depression of the cam member against the action of the spring attached thereto to actuate the links and swing the shutter plates so as to close the feed opening and open the discharge opening of the chamber.

BARTHOLOMEW L. CYR.